United States Patent [19]

Elliott

[11] Patent Number: 4,591,382

[45] Date of Patent: May 27, 1986

[54] PROCESS AND APPARATUS FOR RECOVERING AND PURIFYING URANIUM SCRAP

[76] Inventor: Guy R. B. Elliott, 133 La Senda Rd., Los Alamos, N. Mex. 87544

[21] Appl. No.: 133,021

[22] Filed: Mar. 22, 1980

[51] Int. Cl.[4] .............................................. C22B 60/02
[52] U.S. Cl. ................................. 75/84.1 R; 266/212; 266/227; 266/230; 266/239
[58] Field of Search ................... 75/84.1 R, 84.1 A; 266/212, 227, 230, 239

[56] References Cited

U.S. PATENT DOCUMENTS

| | | | |
|---|---|---|---|
| 1,776,544 | 9/1930 | Carrington | 266/230 |
| 2,754,347 | 7/1956 | Wroughton et al. | 75/84.1 R |
| 2,766,110 | 10/1956 | Meister | 75/84.1 R |
| 2,771,357 | 11/1956 | Wroughton | 75/84.1 R |
| 2,782,117 | 2/1957 | Wilhelm et al. | 75/84.1 A |
| 2,849,308 | 8/1958 | Foote | 75/84.1 R |
| 2,918,366 | 12/1959 | Buyers et al. | 75/84.1 R |
| 3,322,679 | 5/1967 | Kamemoto et al. | 252/301.1 W |
| 4,325,539 | 4/1982 | Hicter et al. | 266/227 |

*Primary Examiner*—Edward A. Miller

[57] ABSTRACT

There is disclosed a process and apparatus for recovering metallic uranium from scrap containing metallic uranium by introducing such metallic uranium scrap into a bath containing, in molten form, at least one member selected from the group consisting of $BaF_2$, $CaF_2$, $MgF_2$, $LiF$, $YF_3$, trifluorides of lanthanides and mixtures thereof, preferably with such member constituting at least 75 mole percent of the bath at a temperature above the melting point or uranium and under an inert atmosphere and casting the purified molten metallic uranium. The bath of molten salt preferably includes means for improving contact between the molten metallic uranium scrap and the molten salt during passage of the molten uranium through the bath of molten salt.

6 Claims, 4 Drawing Figures

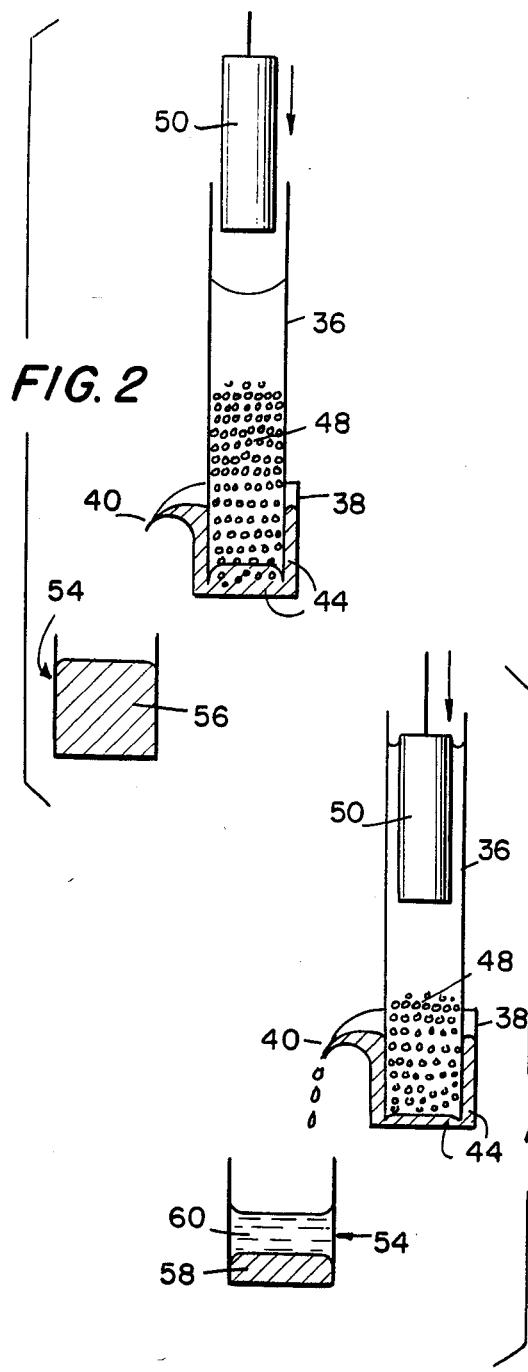
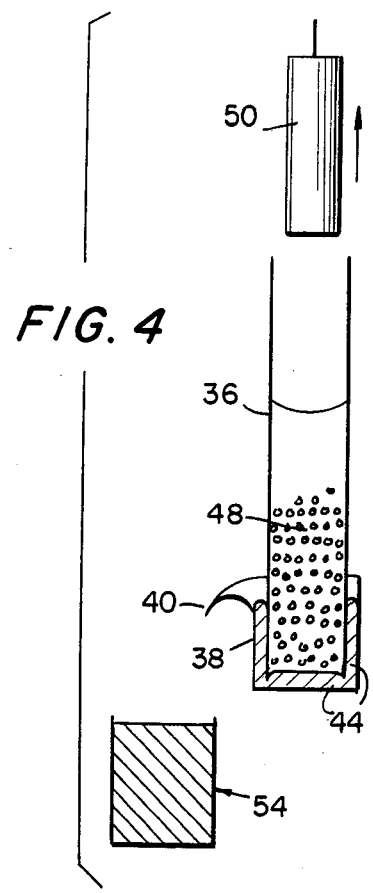

PROCESS AND APPARATUS FOR RECOVERING AND PURIFYING URANIUM SCRAP

BACKGROUND OF THE INVENTION

This invention relates to the recovery and purification of metallic uranium scrap, and more particularly to a novel process and apparatus for the production of bulk metallic uranium from metallic uranium scrap, especially scrap of depleted uranium.

Natural uranium, i.e., the material that is mined from the earth, contains 0.005 percent uranium-234 ($U^{234}$), 0.7 percent $U^{235}$, and 99.295 percent $U^{238}$. Depleted uranium "DU" is a byproduct of isotope separation processes, primarily the gaseous diffusion process, through which uranium containing a higher content of the $U^{235}$ isotope, referred to as enriched uranium, is produced from natural uranium. Enriched uranium is used for reactor fuel and nuclear weapons. DU, the residue of the enrichment process, contains only a portion of the original $U^{235}$ and $U^{234}$ and is therefore "depleted" in these isotopes. The isotope distribution will vary with different enrichment goals. DU is a high density metal used as counterweights in some military and commercial aircraft, as components in some military projectiles, and as shielding material in containers in which highly radioactive material such as $Co^{60}$ are stored and used. During production of the above items, DU scrap is produced.

The values of natural and enriched uranium metal range from $40 per pound to well over $10,000 per pound, depending upon purity and level of enrichment. Therefore, highly efficient recovery procedures, even though very expensive, are used for the recycling of these materials. On the other hand depleted uranium is worth $0.50 to $2.00 per pound in bulk, and no economically suitable recovery scheme has been developed for recovering and re-using this scrap. Instead, several thousand pounds per day of metallic scrap (turnings, crops, rejects, etc.) are placed in drums, packed with nonflammable material and transported to radioactive-waste dumps where the drums are buried. The burial of such radioactive waste is becoming very restricted and increasingly costly.

In "Reactor Handbook," Second Edition, Volume 1, pp 98-104, and Volume 2, pp. 379-391, the engineering aspects of industrial and governmental uranium processing is disclosed (i.e. $UF_4$ reduction) in essentially the same manner in which uranium processing is currently being conducted, and in particular, identifying the importance of allowing time for phase separations of molten uranium from $MgF_2$ or $CaF_2$, either in derby or dingot reduction. This time for separation is achieved by preheating and by size and shape considerations only; no use is made of cleaning at temperature or of eutectic mixtures. $CaF_2$, $MgF_2$, and various oxides are identified as liners for graphite containers. Uranium chips along with trapped debris are pressed into briquettes prior to melting under vacuum along with other metallic uranium scrap. Oxide scums and volatile impurities are identified as sources of problems in the uranium remelting, and it is also recognized that graphite crucibles lead to carbon pickup. Oxide scums create problems also at the metal-salt interfaces during the original reductions of $UF_4$ by calcium or magnesium.

In "Uranium Metallurgy" by W. D. Wilkinson, there is disclosed the melting of uranium chips in crucibles lined with magnesium zirconate covered with a protective layer of a mixture of calcium fluoride and magnesium fluoride; this melting yields ingots containing 400-600 ppm of carbon. This large carbon addition is grossly unacceptable for much uranium recycling; it is a consequence jointly of the use of an improper salt ($MgF_2$) together with the use of an improper container material (graphite).

OBJECTS OF THE INVENTION

An object of the present invention is to provide a novel process and apparatus for recovering, purifying and producing bulk uranium metal from depleted-uranium scrap.

Another object of the present invention is to provide a novel process and apparatus for recovering and purifying metallic uranium from depleted uranium scrap minimizing scum and vaporization problems of the prior art.

A further object of the present invention is to provide a novel process and apparatus for recovering, purifying and producing bulk uranium metal.

Still another object of the present invention is to provide a novel process and apparatus for recovering and purifying metallic uranium from depleted uranium scraps avoiding carbon pickup.

Yet another object of the present invention is to provide a novel process and approach for removing carbon nitrogen, silicon, and oxygen from uranium scrap.

A still further object of the present invention is to provide a novel bath of molten salt substantially unreactive with uranium to purify molten uranium.

SUMMARY OF THE PRESENT INVENTION

These and other objects of the present invention are achieved by a novel process and apparatus for recovering and purifying metallic uranium from scrap containing metallic uranium by introducing such metallic uranium scrap into a bath containing, in molten form, at least one member selected from the group consisting of $BaF_2$, $CaF_2$, $MgF_2$, LiF, $YF_3$, trifluorides of lanthanides and mixtures thereof, preferably with such members constituting at least 75 mole percent of the bath. The molten salt bath is under an inert atmosphere and at a temperature above the melting point of uranium. Molten uranium is recovered after passage through the molten salt bath. The bath of molten salt preferably includes means for improving contact between the molten metallic uranium scrap and the bath of molten salt during passage of the molten uranium scrap through the bath of molten salt.

BRIEF DESCRIPTION OF THE DRAWINGS

Understanding of the present invention will be facilitated by referring to the following detailed description when taken in conjunction with the accompanying drawings wherein like numerals designate like parts throughout in which:

FIG. 2 illustrates the molten salt-molten uranium system during casting of molten uranium;

FIG. 3 illustrates the molten salt-molten uranium system during removal of impurities; and FIG. 4 illustrates the molten salt-molten uranium system after removal of impurities.

DETAILED DESCRIPTION OF THE DRAWINGS

Figure 1:
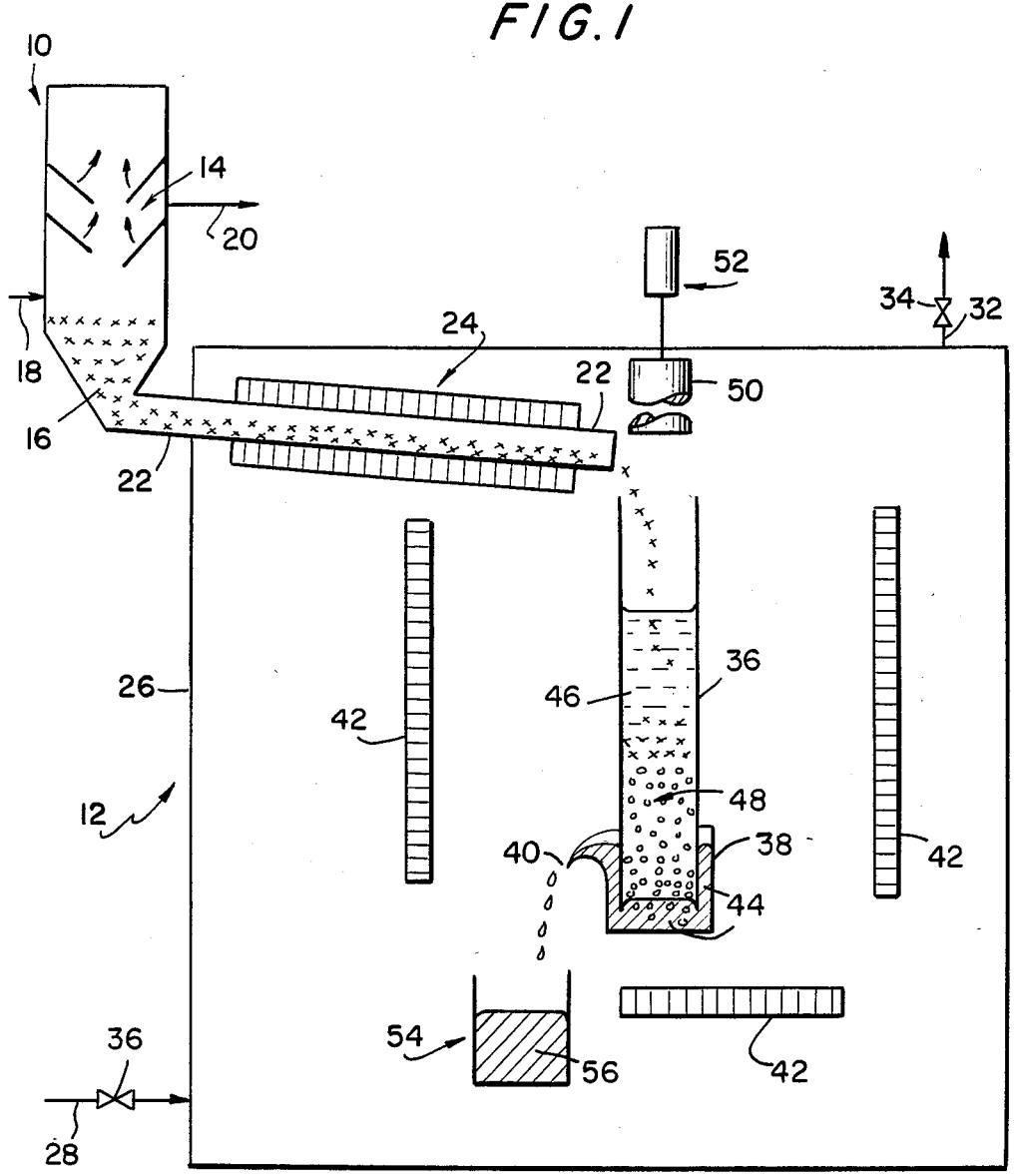
FIG. 1 is a schematic view of the process and apparatus of the present invention.

Referring now to FIG. 1, there is provided a uranium feed-hopper assembly and a metallic-uranium melting assembly, generally indicated as 10 and 12, respectively. The uranium feed hopper 10 is comprised of a vacuum lock-hopper system and a material-storage bin, generally indicated as 14 and 16. The vacuum lock-hopper system 14 is such as known and used by one skilled in the art and includes an inert gas inlet conduit 18 and an evacuation gas conduit 20. The material-storage bin 16 of the uranium hopper assembly 10 is provided with a ceramic conduit 22 in communication with a furnace assembly, generally indicated 24, disposed within the metallic-uranium melting assembly 12 including an outer support structure 26 comprising an inert gas inlet conduit 28 under the control of valve 30, and an outlet gas conduit 32 under the control of valve 34.

The metallic-uranium melting assembly 12 includes a column 36 formed within a suitable support structure (not shown) and disposed within a cylindrically-shaped reservoir 38 including a lip portion 40 all formed of or lined with a ceramic material comprised of $UO_2$, $ThO_2$, MgO, $Y_2O_3$, or trivalent oxides of the lanthanides in which one or more of these oxides jointly make up at least 75% of the composition of the resulting ceramic material. The column 36 is in communication with an end of the ceramic conduit 22 which in turn is in communication with the uranium feed hopper 10. Surrounding the column 36 and reservoir 38, there are provided heater elements, generally indicated as 42, for maintaining the temperature above the melting point of metallic uranium, as more fully hereinafter discussed.

Within the lower portion of the column 36 and within reservoir 38, there is provided cleaned molten uranium 44 supporting a bath 46 containing, in molten form, at least one member selected from the group consisting of $BaF_2$, $CaF_2$, $MgF_2$, LiF, $YF_3$, trifluorides of lanthanides and mixtures thereof, preferably with such members constituting at least 75 mole percent of the bath. The bath 46 of molten salt is supported as a result of the differences in the densities between the bath 46 of molten salt (approximately 3 to 4 gm/cm³) and the molten uranium (approximately 18 gm/cm³).

Thus, the uranium 44 in the column 36 is depressed by about 3/18 or 4/18 of the vertical height of the molten salt 46 in the column 36 in order to support the bath 46 of molten salt on the molten uranium 44. This combination of column 36 and reservoir 38 serve as a trap through which molten uranium flows by gravity, but through which the molten salt cannot escape, except as hereinafter described with reference to the removal of impurities. As a means to provide for improved contact between the bath 46 of molten salt and molten uranium descending through the column 36, the column 36 is provided with a bed of ceramic pellets, generally indicated as 48. Such pellets are more dense than the molten salt, but less dense than the molten uranium; most of such pellets are chemically inert toward the molten salt and molten uranium and preferably of like composition to the ceramic material or liner of the column 36. Further pellets of reactive titanium oxide can be included in the pellet bed 48. The pellets either float on the molten uranium 44 in the column 36 with some pellets being forced into the upper regions of the molten uranium 44 to support the pellets above, or the pellets may rest on the solid bottom of the reservoir 36 when the volume of molten uranium is small.

A piston 50 under control of a hoisting and driving assembly, generally indicated as 52 is provided to effect removal of the impurities from the process, as fully hereinafter discussed.

In operation, metallic uranium scrap comminuted into small pieces for ease of handling, cleaned to remove dust, oil and grease, generally indicated by the "x", is introduced into the uranium feed hopper 10. The vacuum lock-hopper assembly 14 is thereafter closed to permit evacuation of the air in the hopper via conduit 20 followed by the introduction via conduit 18 of an inert atmosphere, such as an argon-helium mixture of like density to air to replace air which has been removed by evacuation. Such an inert atmosphere is maintained at slightly less than atmospheric pressures through all subsequent processing operations through the use of glove-box techniques, such as are known and used by one skilled in the art. The metallic uranium scrap is passed through the furnace assembly 24 and heated to a temperature of about 1200° K. to about 1400° K., preferably about 1300° K., prior to introduction into the bath 46 containing, in molten form, at least one member selected from the group consisting of $BaF_2$, $CaF_2$, $MgF_2$, LiF, $YF_3$, trifluorides of lanthanides and mixtures thereof, preferably with such members constituting at least 75 mole precent of the bath.

The molten salt selected is of low volatility to thereby be restricted to the bath 46 and thermodynamically stable under existing conditions so that the salt does not excessively react with molten uranium to form dilute solutions of $UCl_3$, or $UF_3$ and dissolved metals, such as exhibited by the salts such as NaCl, KCl, and KF. Additionally, the salt is not hygroscopic, since such salt tends to form molten hydroxides, which introduce hydrogen and oxygen into the uranium, and metal into the salt and vapor. Additionally, the molten salt is largely unreactive with the ceramic material or liner for the column 36. Excellent satisfaction of such requirements is offered by a bath 46 containing, in molten form, at least one member selected from the group consisting of $BaF_2$, $CaF_2$, $MgF_2$, LiF, $YF_3$, trifluorides of lanthanides and mixtures thereof, preferably with such members constituting at least 75 mole percent of the bath.

Special advantages in reducing the concentration of impurities in the molten uranium can be obtained by selecting pure salts or mixtures which melt near or below the melting point of uranium. With the list of suitable fluorides, $MgF_2$ is somewhat less stable thermodynamically than would be desired. $SrF_2$ is unsatisfactory because of unsuitable eutectic behavior and cost.

The heating elements 42 maintain the temperature of the bath 46 in the column 36 and the uranium 44 in reservoir 38 at a temperature above the melting point of metallic uranium. Preferably, the temperature at the top of the column 36 is from 50° to 125° K. higher than the average temperature thereof. As hereinbefore discussed, the bath 46 of molten salt is preferably provided with a bed 48 of ceramic pellets to improve contact between the molten uranium falling through the bath 46 of the molten salt to effectively remove insoluble oxides from the molten uranium whereby such impurities move into the molten salt. If pellets of titanium oxide are included with the pellet bed 48, or if titanium is dissolved in the uranium, then carbides, nitrides and silicides of titanium are formed which float at the top of the molten uranium 44 within the column 36 and the uranium will thereby be purified of carbon, nitrogen and silicon; if titanium oxide is used, however, it will result in the addition of titanium to the uranium, and such titanium addition may be undesirable in some subsequent uranium uses. Molten uranium overflows the pouring lip 40 and is collected in a billet mold 54 to form a uranium billet 56.

At preselected time intervals when the removal of impurities is deemed advisable, the introduction of uranium strap into column 36 is halted and the piston 50, referring now to FIG. 2, is caused to be lowered by the hoisting and driving assembly 52. Continued downward movement of the piston 50, referring to FIG. 3, causes the bath 46 of molten salt to be downwardly displaced within the column 36 until the interfacial molten uranium and salt including impurities are caused to flow into the reservoir 38. Continued downward movement causes the interfacial material, including impurities, to overflow the pouring lip 40 and into a waste billet mold 58 which has replaced uranium billet mold 54 to form a waste billet 60 which is rejected and disposed of in subsequent operations (not shown).

Thereafter, the piston 50 is caused to be raised by the hoisting and driving assembly 52, referring now to FIG. 4, whereby the respective liquid levels of the bath 46 of molten salt and molten uranium 44 are lowered with make-up salt being introduced into the column 36 concomitantly with the resumption of the introduction of uranium scrap into the process.

EXAMPLE

Operation of the process and apparatus is described in the following example which is intended to be merely illustrative and the invention is not to be regarded as limited thereto.

600 Pounds of cleaned uranium scrap is introduced into the feed assembly 10 having a volume of about 1.5 cubic feed with air being subsequently replaced by an inert atmosphere of argon-helium. The scrap is passed to the furnace assembly 24 and heated to about 1300° K. The heated scrap is introduced into the bath 46 of molten salt maintained at a temperature of about 1425° K. with a top column temperature of about 1500° K. Molten uranium overflows the lip 40 and falls into the billet mold 54.

While the process of the present invention has been described with reference to the removal of impurities by use of a piston introduced into the column 36, other methods for the removal of impurities may be effected, such as introducing an additional amount of molten salt whereby the height of the bath 46 of molten salt is raised to a point whereby such interfacial molten salt is displaced from the column 36 into the reservoir 38. Additionally, a piston assembly including a piston for introduction into a much enlarged reservoir 38 may be used to facilitate uranium billet and/or waste billet formation. Still further, while the process of the present invention is described with reference to substantially continuous operation, it is understood that the present invention may be effected in operations other than continuous.

While the invention has been described in connection with an exemplary embodiment thereof, it will be understood that many modifications will be apparent to those of ordinary skill in the art and that this application is intended to cover any adaptations or variations thereof.

What is claimed is:

1. A process for producing metallic uranium from scrap containing metallic uranium, which comprises:
    (a) forming in a contact zone under an inert atmosphere a bath supported on molten uranium, said bath containing, in molten form, at least one member selected from the group consisting of $CaF_2$, $BaF_2$, $MgF_2$, $LiF$, $YF_3$, trifluorides of lanthanides, and mixtures thereof, said bath being at a temperature above the melting point of uranium and said contact zone including contact means within said bath for intimately contacting said bath and said scrap containing metallic uranium;
    (b) introducing under an inert atmosphere said scrap containing metallic uranium into said bath under conditions to form molten uranium; and
    (c) recovering metallic uranium from said molten uranium from said molten uranium supporting bath wherein said bath includes solid titanium oxide to remove carbon, nitrogen, and silicon.

2. A process for producing metallic uranium from scrap containing metallic uranium, which comprises:
    (a) forming in a contact zone under an inert atmosphere a bath supported on molten uranium, said bath containing, in molten form, at least one member selected from the group consisting of $CaF_2$, $BaF_2$, $MgF_2$, $LiF$, $YF_3$, trifluorides of lanthanides, and mixtures thereof, said bath being at a temperature above the melting point of uranium and said contact zone including contact means within said bath for intimately contacting said bath and said scrap containing metallic uranium;
    (b) introducing under an inert atmosphere said scrap containing metallic uranium into said bath under conditions to form molten uranium; and
    (c) recovering metallic uranium from said molten uranium supporting bath wherein titanium is present to remove carbon, nitrogen, and silicon.

3. An apparatus for producing metallic uranium from scrap containing metallic uranium, which comprises:
    a reservoir means for molten uranium;
    a column disposed in said reservoir for a bath of a molten salt supported on said molten uranium;
    means to provide fluid communication between said column and said reservoir;
    means for maintaining said column and said reservoir at a temperature above the melting point of uranium;
    means for introducing said scrap containing metallic uranium into said column; and
    means for removing molten uranium from said reservoir means wherein said apparatus includes a lip means for withdrawing said molten uranium.

4. An apparatus for producing metallic uranium from scrap containing metallic uranium, which comprises:
    a reservoir means for molten uranium;
    a column disposed in said reservoir for a bath of a molten salt supported on said molten uranium;
    means to provide fluid communication between said column and said reservoir;
    means for maintaining said column and said reservoir at a temperature above the melting point of uranium;
    means for introducing said scrap containing metallic uranium into said column; and
    means for removing molten uranium from said reservoir means wherein said apparatus includes piston means for displacing interfacial molten metal and salt including impurities.

5. An apparatus for producing metallic uranium from scrap containing metallic uranium, which comprises:
a reservoir means for molten uranium;
a column disposed in said reservoir for a bath of a molten salt supported on said molten uranium;
means to provide fluid communication between said column and said reservoir;
mean for maintaining said column and said reservoir at a temperature above the melting point of uranium;
means for introducing said scrap containing metallic uranium into said column; and
means for removing molten uranium from said reservoir means wherein said reservoir and column are formed of or lined with a ceramic material including an oxide selected from the group consisting of $UO_2$, $ThO_2$, $MgO$, $Y_2O_3$ and trivalent oxides of the lanthanides.

6. The apparatus as defined in claim 5 wherein said oxide forms at least 75 percent of the ceramic material.